C. C. PLUMMER.
CREAM RIPENER.
APPLICATION FILED OCT. 6, 1911.
1,036,704.
Patented Aug. 27, 1912.
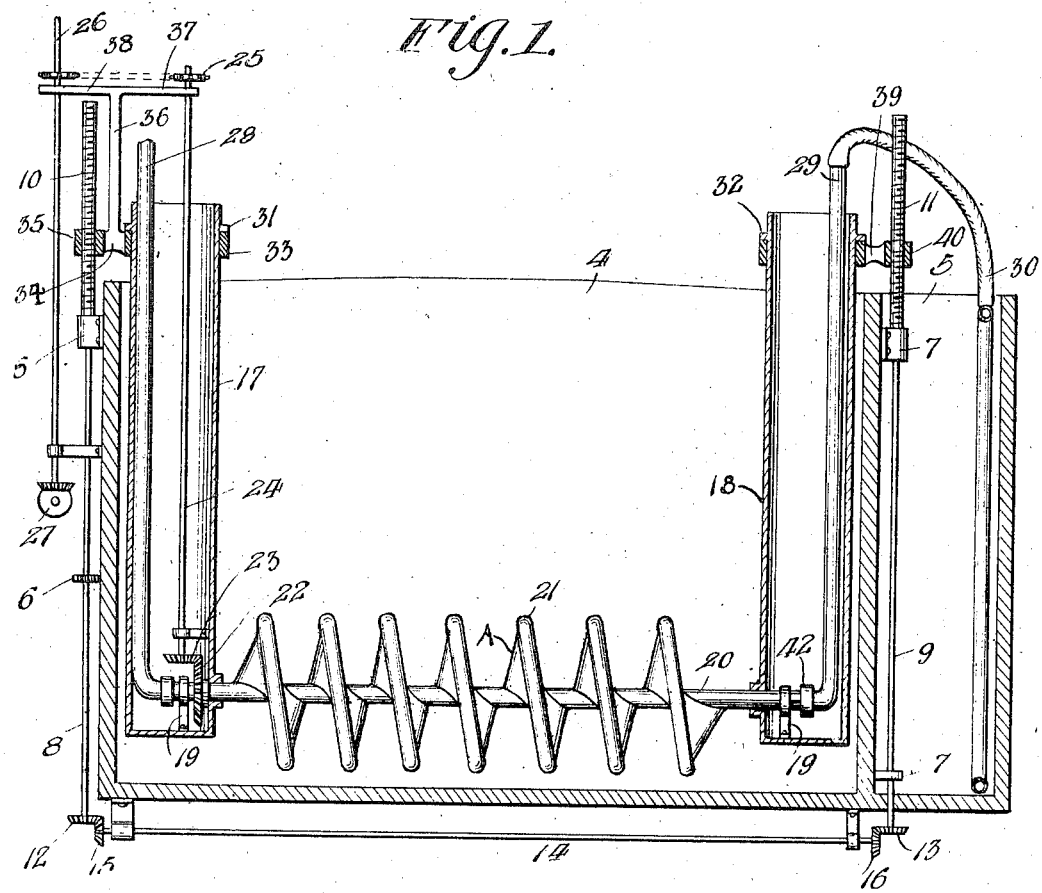
Fig. 1.
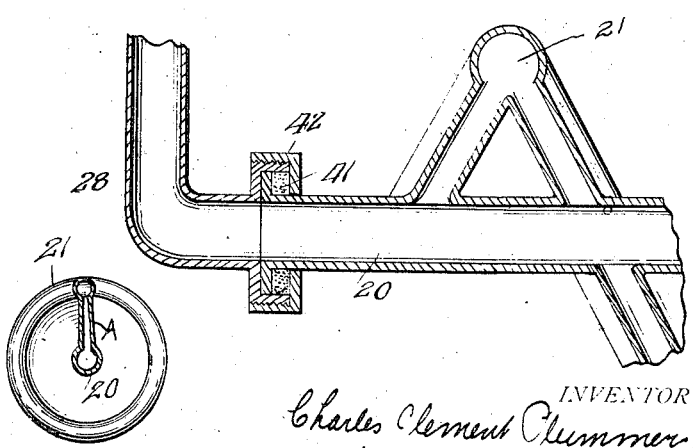
Fig. 2.
Fig. 3.
WITNESSES
INVENTOR
Charles Clement Plummer,
by Frank A. ......... Attorney

UNITED STATES PATENT OFFICE.

CHARLES CLEMENT PLUMMER, OF CHESTER, IOWA.

CREAM-RIPENER.

1,036,704. Specification of Letters Patent. Patented Aug. 27, 1912.

Application filed October 6, 1911. Serial No. 653,202.

*To all whom it may concern:*

Be it known that I, CHARLES CLEMENT PLUMMER, a citizen of the United States of America, and resident of Chester, in the county of Howard and State of Iowa, have invented certain new and useful Improvements in Cream-Ripeners, of which the following is a specification.

This invention relates to cream ripeners and particularly to means for controlling the temperature of the cream and for agitating the same An object of this invention is to provide novel means for circulating the heating or cooling medium through the cream contained in a vat, novel means being provided for permitting the circulation of the heat interchanging medium, novel means being furthermore provided for agitating or moving the said heat interchanging medium vertically of the vat in order that the temperature of the cream may be uniform throughout.

A still further object of this invention is to provide novel means for rotating the heat interchanging medium, means being also provided for elevating or lowering the heat interchanging medium without interrupting its rotary movement.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of a vat with the invention partly in section applied thereto; Fig. 2 illustrates a sectional view of the heat interchanging medium and the mode of connecting the same to supply or discharge pipes; and Fig. 3 illustrates a sectional view of the agitator.

In these drawings 4 denotes a vat which is adapted to contain cream and 5 is an auxiliary chamber which may contain water subjected to the action of ice for the purpose of coacting it or the said water may be subjected to the action of heat for the purpose of raising the temperature, the function of the tank being to supply cool liquid to the heat interchanging pipes in hot weather and warm water to the heat interchanging pipes in cool weather in order that the cream within the vat may be kept at the proper temperature to insure its ripening under the best possible conditions.

The vat is provided on its exterior with bearings 6, 6, at one end and bearings 7, 7, at the opposite end, which bearings are for the purpose of rotatably holding the shafts 8 and 9 respectively. The shaft 8 has a screw 10 on its upper end, whereas the shaft 9 has a screw 11 on its upper end. The lower ends of the shafts 8 and 9 have gear wheels 12 and 13 respectively which are driven by a shaft 14 having gear wheels 15 and 16 respectively, meshing with the gear wheels 12 and 13.

Within the vat 4 are housings 17 and 18, each of which has a bracket 19 therein in which a pipe 20 is rotatably mounted, the said pipe extending through the walls of the casings 17 and 18, a liquid tight joint being provided where the said pipe extends through the said walls. Intermediate the end of the pipe 20 a coil 21 has its ends in communication with the said pipe, the said coil being wound around the pipe in order that it will act as an agitator when the pipe is rotated and in order also that liquid may circulate through it for the purpose of heating or cooling the cream contained in the vat according to whether the cream in the vat is to be heated or cooled. The coil 21 is connected to the pipe 20 by a hollow web A the opening of which flares from the coil to the pipe.

Within the housing 17 the pipe 20 has a gear wheel 22 which meshes with a gear wheel 23 on the shaft 24, the said shaft having a sprocket wheel 25 near its upper end suitably driven from the shaft 26, the latter shaft being journaled in appropriate bearings and having power communicated to it through the gearing 27. While I have specified the method of driving the shaft 24 through the sprocket wheel 25 and the gearing, it is to be understood that the exact manner of communicating motion to the shaft 24 is an immaterial detail of construction, and I do not, therefore, wish to be limited in this respect.

The pipe 20 has its ends in communication with the pipes 28 and 29 respectively, the former of which may lead to a circulating pump or the like whereas the latter pipe 29 may have a hose or other conduit 30 connected to it leading into the chamber 5 where it is supplied with the heating or cooling liquid as the case may be.

The housing 17 has an annular flange 31 on its exterior and the housing 18 has an annular flange 32 on its exterior. The housing 17 has a collar 33 which engages the annular flange 31, the said collar 33 having an arm 34 terminating in a hollow boss 35 threaded internally to receive the screw 10. The arm 34 is further provided with a bracket 36 with lateral projections 37 and 38 which form bearings for the shafts 24 and 26 respectively. The housing 18 is embraced by a collar 38 having an arm 39 with a hollow boss 40 which is threaded to receive the screw 11. It will be observed, therefore, that by the rotation of the shaft 14, the shafts 8 and 9 are rotated and consequently the screws 10 and 11 are turned to raise the collar which have their arms supported by the screws and the said collars in turn communicate motion to the housing, elevating or lowering them according to the direction of rotation of the said shafts.

By reason of the provision of the mechanism just described, it is apparent that an operator may elevate or lower the housing, consequently lowering or elevating the heat interchanging coil 21 and as means are provided for rotating the said heat interchanging means, it follows that the cream contained in the vat will be simultaneously agitated and acted upon by the agent within the coils. The operator may, therefore, control the temperature of the cream within the vat while at the same time agitating it for the purpose of uniformly ripening the said cream. As shown in Fig. 2, a packing box 41 is interposed between the pipe 20 and the pipe 29, thus permitting the rotation of the pipe 20 independently of the pipes 28 and 29.

The manner of cooling the contents of the chamber 5 or of heating the said contents is immaterial although it is common in practice to supply ice to the said chamber for the purpose of cooling the said liquid and to heat the chamber in any appropriate way when the temperature of the liquid within the vat is to be raised.

I claim—

1. In a cream ripening machine, a vat, housings vertically movable therein and means for moving them, a pipe rotatably mounted in the housing, and means for rotating the pipe.

2. In a cream ripening machine, a vat, housings vertically movable therein and means for moving them, a pipe rotatably mounted in the housing, means for rotating the pipe, and a coil in communication with the pipe, the said coil surrounding the pipe.

3. In a cream ripening machine, a vat, housings in the vat, means for moving the housings vertically, a pipe rotatable in the vat and supported by the housings, means for rotating the pipe, and means for supplying liquid to the pipe.

In testimony whereof, I affix my signature in the presence of two witnesses.

CHARLES CLEMENT PLUMMER.

Witnesses:
CHAS. H. THOMAS,
E. D. CAPPER.